United States Patent [19]

King, Jr. et al.

[11] Patent Number: 4,521,147
[45] Date of Patent: Jun. 4, 1985

[54] FLUSH HEAD BLIND FASTENER

[76] Inventors: John O. King, Jr.; John O. King, III, both of 3990 N. Ivy Rd., Atlanta, Ga. 30342

[21] Appl. No.: 397,018

[22] Filed: Jul. 12, 1982

Related U.S. Application Data

[63] Continuation-in-part of Ser. No. 370,060, Apr. 20, 1982.

[51] Int. Cl.³ .............................................. F16B 13/04
[52] U.S. Cl. ...................................... 411/43; 411/70; 411/542; 411/44
[58] Field of Search .................... 411/369, 542, 43, 70, 411/56, 34, 69, 44

[56] References Cited

U.S. PATENT DOCUMENTS

| | | | |
|---|---|---|---|
| 1,994,210 | 3/1935 | Chobert | 411/44 X |
| 2,030,088 | 2/1936 | Young | 411/369 X |
| 3,239,036 | 3/1966 | Scott | 411/542 X |
| 3,302,510 | 2/1967 | Gapp | 411/43 |
| 3,345,901 | 10/1967 | Brosseit | 411/70 |
| 3,426,375 | 2/1969 | Jeal | 411/43 X |
| 4,102,030 | 7/1978 | King, Jr. | 411/542 X |
| 4,348,140 | 9/1982 | Bergholz et al. | 411/34 X |
| 4,405,256 | 9/1983 | King, Jr. | 411/69 X |

FOREIGN PATENT DOCUMENTS

| | | | |
|---|---|---|---|
| 724509 | 1/1932 | France | 411/43 |
| 472329 | 9/1937 | United Kingdom | 411/70 |
| 594859 | 11/1947 | United Kingdom | 411/43 |
| 625331 | 6/1949 | United Kingdom | 411/70 |

Primary Examiner—Thomas J. Holko
Assistant Examiner—Rodney M. Lindsey
Attorney, Agent, or Firm—B. J. Powell

[57] ABSTRACT

A double action blind rivet assembly comprising an outer sleeve member with an annular head flange at one end and having an initial outside diameter such that it is receivable through the holes in the workpieces and a length such that it projects from the blind side of the workpieces for the formation of a blind head therein; an inner sleeve member with an annular head flange at one end and having an outside diameter larger than the inside diameter of the outer sleeve member so that, when the inner sleeve member is driven into the outer sleeve member from the accessible side of the workpieces, it will expand the outer sleeve member into a prescribed interference fit by expanding the holes through the workpieces with the inner sleeve member also having a length such that it projects from the blind side of the workpieces after it is driven into the outer sleeve member; and internally supporting the inner sleeve member while it is being driven into the outer sleeve member with a blind head former section thereon on the blind side of the workpieces and a gripping section projecting out of the sleeve members on the accessible side of the workpieces so that the gripping section can be used to pull the head former section into the sleeve members after the inner sleeve member is driven to form the blind head on the blind side of the workpieces. The method of using the fastener is also disclosed.

15 Claims, 21 Drawing Figures

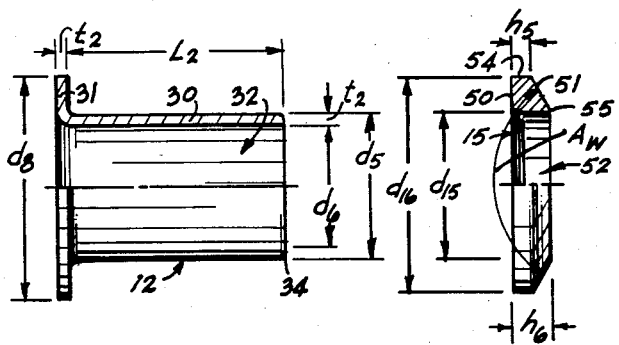
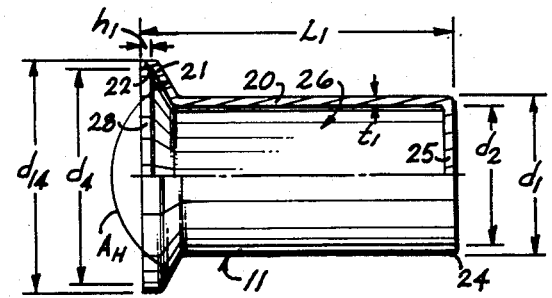
FIG 2    FIG 3    FIG 1
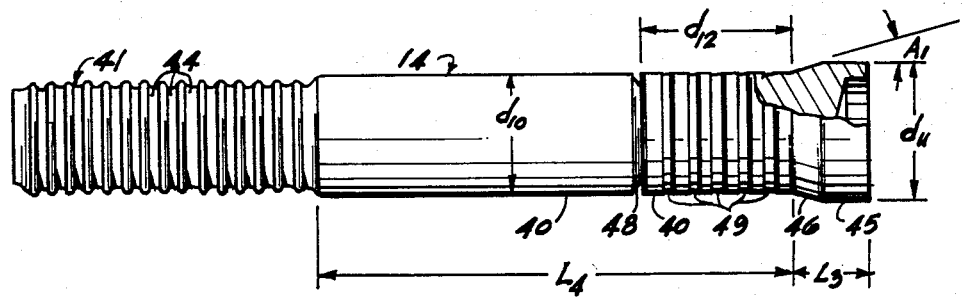
FIG 4
FIG 5    FIG 6
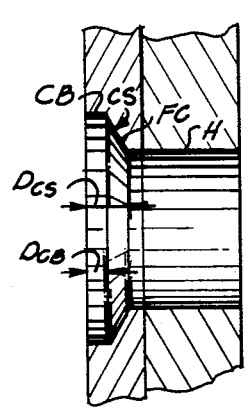
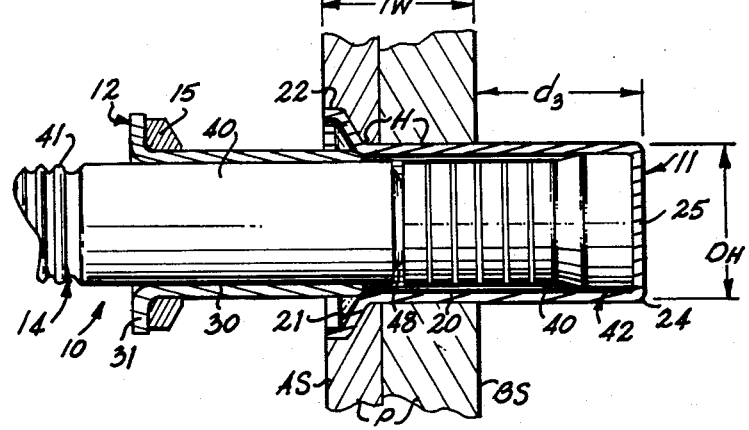
FIG 7    FIG 8
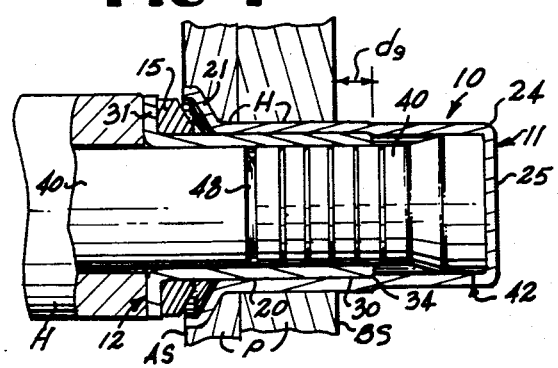
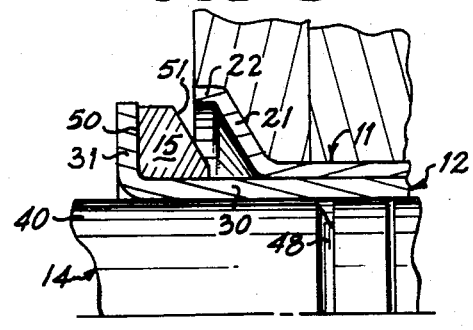

FLUSH HEAD BLIND FASTENER

CROSS-REFERENCE TO RELATED APPLICATION

This application is a continuation-in-part of my copending application Ser. No. 370,060 filed Apr. 20, 1982.

I. TECHNICAL FIELD

This invention relates generally to blind fasteners and more particularly to blind fasteners installed in interference fit.

II. BACKGROUND ART

It has been found that the fatigue life of structural joints using fasteners is increased when the fasteners are installed in interference fit, i.e. the diameter of the fastener is larger than the hole diameter so that the holes are expanded to incude a compressive stress gradient therearound during the installation of the fastener. While interference fit has been accomplished using fasteners requiring access to both sides of the workpieces for installation, such interference fit has generally not been available when use of blind rivets was required. It is important that the interference fit be provided along the entire length of the holes including any countersink area where countersunk fasteners are used.

Such blind rivets typically have a relatively soft sleeve mounted on a stem which is pulled to install the rivet. Pulling on the stem usually deforms the sleeve axially to expand the sleeve both inwardly and outwardly to fill the space between the stem and the holes and then forms the blind head on the sleeve. Because the sleeve is soft, it did not have sufficient strength to expand the holes to produce an interference fit. Examples of this type of blind rivet are illustrated in U.S. Pat. Nos. 2,931,532; 3,148,578 and 4,012,984.

A blind rivet which does have the capability of producing an interference fit is proposed in U.S. Pat. No. 3,820,297. This rivet also has a sleeve mounted on a stem to install the rivet by pulling on the stem. The stem has a shank with a diameter larger than the initial inside diameter of the sleeve so that, when the shank is pulled into the sleeve, it expands the sleeve into an interference fit. Since the shank on the stem must be strong enough to expand the sleeve without wire drawing, it is difficult to provide grip adjustment while at the same time permitting the stem to be separated with a breakneck groove so that the end of the stem is always flush with the head of the sleeve. Since the shank on the stem must be at least as long as the grip length of the sleeve and protrudes out of the sleeve for its full length on the blind side of the workpieces prior to being pulled, the required blind side clearance must be greater than that for most other blind fasteners in order for the interference fit blind fastener to be used.

None of these blind rivets has the capability of providing an interference fit in the countersunk area where countersunk blind fasteners were used. Thus, these prior art blind rivets did not have the capability of providing the necessary interference fit to significantly increase fatigue life, especially in the area where the constant diameter holes through the work pieces join with the countersink and where the countersink opened onto the surface of the work pieces. This problem has been appreciated in the past and attempts have been made to prestress the countersink area with solid non-blind rivets which are driven from one side and bucked from the other side of the workpieces during installation. Examples of these type rivets are illustrated in U.S. Pat. Nos. 4,000,680; 4,048,708; and 4,051,592. Because this type rivet requires access to both sides of the work pieces, however, this concept cannot be applied to prior art blind rivets.

Further, application standards for blind rivets require mechanical locking means to lock the stem into the sleeve when the rivet is installed. The prior art has relied on a separate locking collar applied between the head of the sleeve and the stem as an incident to the installation process. This has maintained high manufacturing costs for such blind rivets and/or required more complex tooling to install these rivets.

These prior art rivets have further been installed using a single action, i.e. either pulling or pushing on the stem to move it in a single direction to both expand the sleeve in the hole and form the blind head on the sleeve. As a result, it was not possible to separate the expansion function from the head forming function. Thus, where different force levels are needed during expansion from those needed during blind head formation, installation of these prior art blind rivets to satisfy these criteria have been difficult to achieve.

III. SUMMARY OF THE INVENTION

These and other problems and disadvantages associated with the prior art are overcome by the invention disclosed herein by providing a countersunk blind rivet construction which has the capability of providing an interference fit even in the countersunk area while at the same time requiring minimum of blind side clearance in the work pieces in order for the fastener to be used. The blind rivet of the invention separates the expansion function to provide the interference fit from the blind head forming function to form the blind head on the blind side of the work pieces to provide ease of control of each of these functions.

The blind fastener of the invention includes generally an outer sleeve member, a stem, an inner sleeve member and a deformable washer which fits between the inner and outer sleeve members. The inner sleeve member is driven into the outer sleeve member from the accessible side of the work pieces while being supported on the stem so as to radially expand the outer sleeve member into interference fit with the hole. The deformable washer is placed between the head flanges on the inner and outer sleeve members and is sized so that the washer is deformed to expand the countersunk head flange on the outer sleeve member into interference fit with the countersink in the work pieces during the final driving movement of the inner sleeve member. After the inner sleeve member is driven into the outer sleeve member, the stem is pulled from the accessible side of the work pieces to form the blind head on the outer sleeve member on the blind side of the workpieces. The blind head former on the stem provides for grip adjustment by wire drawing or similar grip adjustment techniques normally used for blind fasteners so that the breakneck groove in the stem can be lined up with the head on sleeve member to allow the stem to be separated flush with the head. Because of the interference fit, locking grooves on the stem engage the inner sleeve member to mechanically lock the stem in position in the sleeve members.

These and other features and advantages of the invention disclosed herein will become more apparent upon consideration of the following specification and accompanying drawings wherein like characters of reference designate corresponding parts throughout the several views and in which:

IV. BRIEF DESCRIPTION OF THE DRAWINGS

FIG. 1 is an enlarged side elevational view shown partly in cross-section of the outer sleeve member used in the fastener assembly of the invention;

FIG. 2 is an enlarged side elevational view shown partly in cross-section of the inner sleeve member used in the fastener assembly of the invention;

FIG. 3 is an enlarged side elevational view shown partly in cross-section of the deformable washer used in the fastener assembly of the invention;

FIG. 4 is an enlarged side elevational view of the stem used in the fastener assembly of the invention;

FIG. 5 is an enlarged longitudinal cross-sectional view of the countersunk holes in which the invention is installed;

FIG. 6 is a longitudinal cross-sectional view of the fastener assembly of the invention ready for installation;

FIG. 7 is a view similar to FIG. 6 showing the inner sleeve member being driven into position and just before deformation of the washer of the invention;

FIG. 8 is a greatly enlarged portion of FIG. 7 showing the washer just before deformation;

Figure 9:
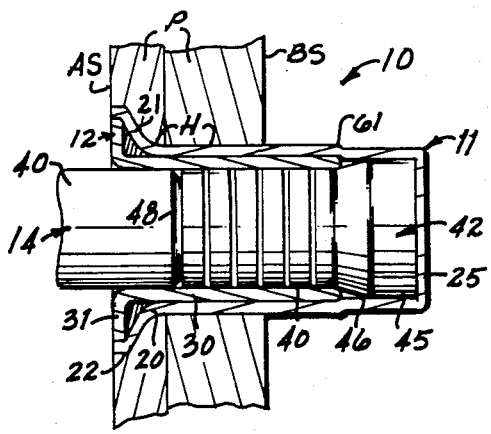
FIG. 9 is a view similar to FIG. 7 showing the inner sleeve fully seated and the washer deformed.

These figures and the following detailed description disclos specific embodiments of the invention; however, it is to be understood that the inventive concept is not limited thereto since it can be incorporated in other forms.

V. DETAILED DESCRIPTION OF ILLUSTRATIVE EMBODIMENTS

Referring to FIGS. 1–6 of the drawings, it will be seen that the countersunk blind fastener assembly 10 includes an outer sleeve member 11, an inner sleeve member 12, a stem 14 and a deformable washer 15. The inner sleeve member 12 is driven into the outer sleeve member 11 while being supported on the stem 14 to radially expand the outer sleeve member 11 into interference fit and to drive the washer 15 into the outer sleeve member 11 to expand the countersunk portion into interference fit. The stem 14 is then pulled to form a blind head on the outer and inner sleeve members 11 and 12 to hold the fastener assembly in place.

The outer sleeve member 11 as seen in FIG. 1 has a seamless cylindrical side wall 20 longer than the combined thicknesses of the workpieces to be attached together at the fastener joint and is provided with an annular countersunk head flange 21 integral with one end thereof which extends outwardly from the side wall 20. The countersunk head flange 21 illustrated is conically shaped to conform to the countersink in the workpieces as will become more apparent. The head flange 21 has an included angle $A_H$ illustrated at about 120°, although other values may be used for an angle $A_H$. The outer peripheral edge of head flange 21 is provided with lip 22 which projects out from the head flange 21 in a direction opposite to that of side wall 20. The lip 22 is oriented parallel to the side wall 20 and concentric therewith to form a trailing end surface 28 on lip 22 normal to the sleeve axis. For sealing installations, the projecting end 24 of the side wall 20 opposite head flange 21 is closed by an end wall 25. The sleeve member 11 thus defines a passage 26 extending from the end wall 25 along the length of side wall 20 and opening through the head flange 21 while the head flange 21 and lip 22 define a counterrecess 29 therein.

The side wall 20 has a thickness $t_1$ with an outside diameter $d_1$ and an inside diameter $d_2$. The outside diameter $d_1$ is about equal to the hole diameter $D_H$ of the holes H through the workpieces P as seen in FIG. 5 in which the fastener assembly is to be installed so that the side wall 20 can be easily inserted in the holes through the workpieces. The side wall 20 also has an effective useful length $L_1$ which is greater than the maximum combined thickness $T_w$ of the workpieces P by a distance $d_3$ so that the blind head can be formed therein as will become more apparent. The lip 22 has a height $h_1$ about equal to the thickness of the head flange on the inner sleeve member 12 as will become more apparent, an inside diameter $d_4$ and an outside diameter $d_{14}$.

The inner sleeve member 12 as seen in FIG. 2 has a seamless cylindrical side wall 30 provided with an outwardly extending annular head flange 31 integral with one end thereof. The head flange 31 is oriented normal to the axis of the side wall 30. Sleeve member 12 defines a passage 32 extending through the side wall 30 and head flange 31. The outside corner of the projecting end 34 of side wall 30 is rounded to permit the sleeve member 12 to be driven into sleeve member 11 as will become more apparent. The outside peripheral edge on the head flange 31 may be forwardly tapered to assist in seating the head flange 31 in lip 22 on the outer sleeve member 11 as will become more apparent.

The side wall 30 has a thickness $t_2$ with an outside diameter $d_5$ and an inside diameter $d_6$. The outside diameter $d_5$ is greater than the inside diameter $d_2$ of the outside sleeve member 11 by that amount which it is desired to expand the outer sleeve member 11. Typically, the head flange 31 has the same thickness $t_2$ as the side wall 30 and an outside diameter $d_8$ greater than the inside diameter $d_4$ of the lip 22 on the outer sleeve member 11 as will become more apparent. The side wall 30 has a length $L_2$ which is equal to the thickness $T_w$ of the workpieces P plus the depth $d_9$ of the blind head to be formed as will become more apparent.

The deformable washer 15 as seen in FIG. 3 is annular with a trailing end surface 50 normal to the central axis of washer 15 and an outside conical surface 51 which tapers inwardly from the trailing to the leading end of washer 15. Washer 15 defines a central passage 52 therethrough having a diameter $d_{15}$ substantially equal to the outside diameter $d_5$ of the side wall 30 of the inner sleeve member 12. The surface of passage 52 typically joins with the trailing end surface 50 with a radius of curvature corresponding to the radius of curvature between the head flange 31 and side wall 30 on the inner sleeve member 12 as will become more apparent. The outside edge of the trailing end surface 50 is joined to the trailing end of the conical surface 51 by a cylindrical peripheral edge surface 54 oriented generally parallel with the washer central axis and with a diameter $d_{16}$ no greater than the inside diameter $d_4$ of the lip 22 on the outer sleeve member 11 as will become more apparent and a height $h_5$. The leading end of washer 15 typically has a leading land surface 55 oriented normal to the washer axis and joining the leading end of the surface of passage 52 with the leading end of the conical surface 51 to facilitate manufacture. The conical surface 51 tapers at an included angle $A_W$ corresponding to the angle $A_H$ of the head flange 21 on the outer sleeve member. While the overall shape of the washer 15 is not critical, it is preferable that the trailing end surface 50 be large enough that the head flange 31 on the inner sleeve member 12 engages this end surface 50 to deform the washer 15 as will become more apparent without undesirably deforming the head flange 31 on the inner sleeve member 12. The washer 15 has an overall height $h_6$ which is greater than the difference between the lip/head flange height on outer sleeve member 11 and the head flange thickness $t_2$ on the inner sleeve member 12 as will become more apparent.

The stem 14 has an elongate central support section 40 integral at one end with a gripping section 41 and at the other end with a head former section 42. The gripping section 41 has annular pull grooves 44 to facilitate gripping the stem 14 by a pulling tool of known construction as will become more apparent. The head former section 42 has an enlarged head portion 45 connected to the central section 40 through a tapered portion 46. The outer end of the head portion 45 may be counterbored to reduce weight. To facilitate separation of the stem 14 after the fastener assembly is installed, a breakneck groove 48 may be provided in the support section 40.

To hold the remaining portion of the stem 14 in the sleeve members 11 and 12 after installation, a plurality of shallow locking grooves 49 may be provided around the support section 40 between the breakneck groove 48 and the head former section 42. Because the sleeve members 11 and 12 will be in interference fit in the holes in the workpieces after the fastener assembly is installed, they are in radial compression. This will cause the inner sleeve member 12 to be forced toward the support section 40 on stem 14 after installation is complete and into the locking grooves 49. The locking grooves 49 are oriented normal to the axis of stem 14 and are axially spaced from each other along the support section 40. Each of the grooves 49 has a locking surface on that side of the groove 49 opposite the head former section 42 which is normal to the axis of stem 14 to form a sharp corner at its juncture with the surface of section 40. A tapered bottom surface extends from the inboard end of normal locking surface out to the surface of section 42 along that side of groove 49 nearest the head former section 42. This construction will allow the inner sleeve member 12 and stem 14 to slide with respect to each other in one direction, but prevent sliding movement in the opposite direction as is more fully explained in our application Ser. No. 370,060.

The stem 14 has an overall length sufficient for the stem to be gripped during installation. The outside diameter $d_{10}$ of the support section 40 is substantially equal to the inside diameter $d_6$ of the inner sleeve member 12 while the outside diameter $d_{11}$ of the head portion 45 is substantially equal to the inside diameter $d_2$ of the outer sleeve member 11. This allows the inner sleeve member 11 to be inserted over the support section 40 while the expansion section 42 can be inserted into the outer sleeve member 11. The head former section 42 has a length $L_3$ sufficient to form and support the desired depth blind head on the fastener assembly as will become more apparent. The support section 40 has a length $L_4$ sufficiently long to internally support the inner sleeve member 12 both during and after installation. The diameter of the gripping section 41 is usually slightly smaller than the diameter of the support section 40. The tapered section 46 defines an angle $A_1$ with respect to the axis of stem 14 and is usually about 15 degrees. To insure that the breakneck groove 48 will be located flush with the head flanges 21 and 31 after the fastener assembly is installed, the groove 48 is located a prescribed distance $d_{12}$ from the head former section 42. To provide for grip adjustment, the head former section 42 may be constructed so as to wire draw as explained in our application Ser. No. 370,060. Other grip adjustment techniques may also be used to provide the desired grip adjustment.

To form the fastener assembly 10 prior to installation as seen in FIG. 6, the stem 14 is inserted into the passage 26 in the outer sleeve member 11 with the head former section 42 leading. The outer peripheral surface on the head portion 45, being of the same diameter as the passage 26, supports the stem 14 so that it is coaxial with the outer sleeve member 11. The washer 15 is slipped over the outside of the side wall 30 of the inner sleeve member 12 with the trailing end surface 50 thereon facing the head flange 31 on sleeve member 12. The inner sleeve member 12 is then inserted over the gripping section 41 and support section 40 projecting out of the outer sleeve member 11 with the projecting end 34 of side wall 30 leading. Because the outside diameter of the inner sleeve member 12 is larger than the inside diameter of the outer sleeve member 11, the projecting end 34 on sleeve member 12 will butt against the countersunk head flange 21 on sleeve member 11 at its juncture with side wall 20 so that sleeve member 12 will be located end-to-end with sleeve menber 11. Usually, the expansion section 42 on stem 14 is seated against the end wall 25 on the outer sleeve member 11 to keep it in place. Various techniques may also be used to retain the various parts in the positions as shown in FIG. 6. One technique which may be used is to make the side wall 20 on the outer sleeve member 11 in the vicinity where the head portion 45 of the head former section 42 is located slightly oval so that the stem 14 is press fitted into the outer sleeve member 11. The side wall 30 on the inner sleeve member 12 may likewise be made slightly oval so that the inner sleeve member 12 is press fitted onto the support section 40 on stem 14. This allows the washer 15 to also be press fitted onto the side wall 30 on the inner sleeve member 12 to retain it in position. The thusly assembled fastener assembly is now ready for installation.

The fastener assembly 10 is designed for use in workpieces P with an accessible side AS and a non-accessible blind side BS as best seen in FIG. 5. The amount of clearance on the blind side BS limits the permissible distance that the fastener assembly 10 can protrude from the blind side of the workpieces. The workpieces P define aligned holes H therethrough of an initial hole diameter $D_H$. The holes H have a countersink CS opening onto the accessible side AS of the work pieces P. The countersink CS includes a substantially cylindrical counterbore section CB which opens onto the accessible side of the work pieces P and a frusto-conical section FC which tapers inwardly from the counterbore section CB to the holes H to join them so that the holes H and countersink CS are concentrically located on the common hole axis. A variety of techniques may be used to produce the holes H and countersink CS. For example, stepped drills or seamers may be used to form both the holes H and countersink CS in a single step operation. The countersink CS is complementary to the initial outside shape of head flange 21 and lip 22 on the outer sleeve member 11 as will become more apparent. Thus, countersink CS has an overall depth $D_{CS}$ about the same as the combined height $h_2$ of lip 22 and head flange 21 while the counterbore section CB has a depth $D_{CB}$ about the same as that of the lip 22 on the outer sleeve member 11 as will become more apparent.

The fastener assembly 10 is inserted in the countersink CS and aligned holes H in the workpieces P from the accessible side AS with the projecting end 24 of the outer sleeve member 11 until the head flange 21 on the outer sleeve member 11 is arrested in the countersink CS as seen in FIG. 6. The projecting end 24 of side wall 20 of the outer sleeve member 11 protrudes from the blind side BS of the workpieces the distance $d_3$ as seen in FIG. 6 while the trailing end surface 28 on the lip 22 of sleeve member 11 is substantially flush with the workpiece surface on the accessible side AS. The distance $d_3$ is equal to the length of the head former section 42 plus the axial length $d_9$ of the blind head to be formed in sleeve members 11 and 12 together with the thickness of the end wall 25 on the outer sleeve member 11. The distance $d_3$ is thus minimized to minimize the blind side clearance space required to use the fastener assembly and thus maximize its application. Since the sleeve members 11 and 12 are located end-to-end, the inner sleeve member 12 will be protruding out of the accessible side AS of the workpieces and supported on the support section 40 of stem 14.

To force the inner sleeve member 12 into the outer sleeve member 11, a tubular impact driving hammer H mounted on a driving tool of known construction is inserted over the stem 14 projecting out of the inner sleeve member 12 on the accessible side of the workpieces until the end of hammer H engages the head flange 31 on the inner sleeve member 12. The central passage in hammer H is large enough to receive stem 14 in clearance therethrough with the stem 14 serving as a guide to keep hammer H coaxial with sleeve member 12. When the driving tool is activated and urged toward the accessible side AS of the workpieces, the end of hammer H will impact against the head flange 31 to drive the inner sleeve member 12 into the outer sleeve member 11 as seen in FIG. 7. As the projecting end 34 of the inner sleeve member 12 is driven into the side wall 20 of the outer sleeve member 11, the projecting end 34 will expand the side wall 20 on sleeve member 11 so that the inside diameter of the outer sleeve side wall is enlarged out to the outside diameter $d_5$ of the inner sleeve side wall 30 since the inner sleeve member 12 is prevented from collapsing by the support section 40 on stem 14 as sleeve member 12 slides thereover. The washer 15 moves with the inner sleeve member 12 as it is driven until the washer 15 seats in the counterrecess 29 at the head flange 21 on outer sleeve member 11. When washer 15 seats in counterrecess 29, its movement is arrested while the inner sleeve member 12 continues to be driven therethrough.

After the projecting end 34 of inner sleeve member 12 expands each portion of side wall 20 of outer sleeve member 11 as inner sleeve member 12 is driven thereinto, the side wall 30 maintains the side wall 20 in this expanded condition. The end wall 25 on the outer sleeve member 11 holds the stem 14 in place while the inner sleeve member 12 is being driven and the support section 40 on stem 14 internally supports the inner sleeve member 12 as it slides therealong. When the side wall 20 is radially expanded as the sleeve member 12 is driven into sleeve member 11, this forces the side wall 20 of the outer sleeve member 11 into contact with the wall of the holes H and then expands the holes H sufficiently to generate an interference fit between the fastener assembly 10 and the workpieces P about holes H. The amount of interference between the fastener assembly 10 and the holes H varies with hole diameter and is normally expressed in terms of a percentage of the nominal hole diameter. Typically, this value is 1–3 percent of the hole diameter. As an example, a reasonable interference for a ¼ inch hole is about 0.004–0.006 inch. The actual difference between the inside diameter of the outer sleeve member 11 and the outside diameter of the inner sleeve member 12 will also take into account the initial clearance between the outer sleeve member 11 and the initial hole diameter.

FIGS. 7 and 8 illustrate the assembly 10 during driving and just before the inner sleeve member 12 is driven into the outer sleeve member 11 far enough for the underside of the inner sleeve head flange 31 to engage the trailing end surface 50 on washer 15. Because the washer height $h_6$ is greater than the difference between the head flange/lip height on sleeve member 11 and the head flange thickness $t_2$ on the sleeve member 12, the trailing end surface 50 on washer 15 extends a small distance into interference with the head flange 31 on inner sleeve member 12 when it is fully seated in the outer sleeve member 11 with the exposed side of head flange 31 flush with the trailing end surface 28 on lip 22 and the accessible side of the work pieces. The washer interference distance $d_{18}$ is selected so that the volume of washer 15 is just sufficient to fill the space between head flanges 21 and 31 when head flange 31 is fully seated and head flange 21 expanded as will become more apparent.

Figure 10:
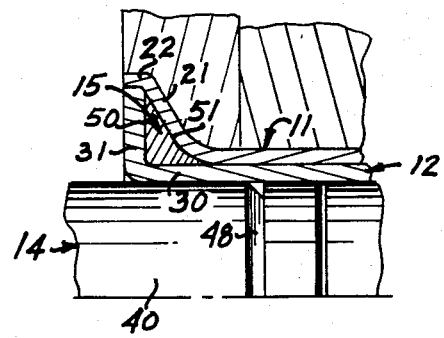
FIG. 10 is a greatly enlarged portion of FIG. 9 showing the washer after deformation.

As the hammer H continues to drive the inner sleeve member past the position seen in FIGS. 7 and 8 toward the fully seated position shown in FIGS. 9 and 10, the underside of head flange 31 engages the trailing end surface 50 on washer 15. Since head flange 31 is harder than washer 15, continued driving of the inner sleeve member 12 caused the end surface 50 to move with sleeve member 12 and thus deform washer 15 so that it is forced to flow toward the bottom of counterrecess 29 in outer sleeve member 11 to expand that area of the outer sleeve member 11 where the head flange 21 and side wall 20 join to place this area in interference with the juncture of the countersink CS and holes H in the workpieces. Since the inner sleeve member 12 is supported against collapse on stem 14, this action also causes the washer 14 to expand the lip 22 on the outer sleeve member 11 into interference with the counterbore CB in workpieces P by the time the inner sleeve member 12 is fully seated as illustrated in FIGS. 9 and 10. The lip 22 on the outer sleeve member 11 has been expanded from diameter $d_{14}$ out to diameter $d_{19}$ or an interference difference $d_{20}$. Thus, it will be seen that the height $h_6$ of washer 15 controls the difference $d_{20}$. Even though washer 15 is made out of a relatively soft metal as compared with that of sleeve members 11 and 12, it is captivated between head flange 21 and lip 22 and head flange 31 so that it is not extruded from therebetween since the outside diameter $d_8$ of head flange 31 is selected to just fit inside lip 22 in its expanded condition.

It will also be appreciated that, unlike most prior art blind rivets, the sleeve members 11 and 12 are relatively strong so that the side walls 20 and 30 thereof are not axially deformed and the side wall thicknesses are not changed significantly as the inner sleeve member 12 is driven into the outer sleeve member 11. The strength of the outer sleeve member 11 is sufficient to prevent it from being extruded as the inner sleeve member 12 is driven into place while the inner sleeve member has sufficient column strength to prevent it from collapsing as it is driven. At the same time, the hoop strength of the sleeve members 11 and 12 should be such that these members may be expanded radially with reasonable forces. The relative strengths of the sleeve members 11 and 12 is, of course, dependent on the amount of interference required. It has been found that A286 stainless steel can be used for the sleeve members 11 and 12 over the full range of interferences likely to be encountered. Where the interference is low, aluminum alloys may be used for sleeve members 11 and 12. The stem 14 is sufficiently strong to internally support the inner sleeve member 12 without deformation as it is driven into position and is typically an alloy steel. The washer 15, on the other hand, is made out of a material that can be deformed. Both aluminum alloys such as 5052 or 6061 and stainless steels such as A286 may be used.

Where the difference between the lengths $L_1$ and $L_2$ of the side walls of sleeve members 11 and 12 is about equal to the length of the head former section 42 on stem 14, the projecting end 34 of side wall 30 on the inner sleeve member 12 will be located adjacent the tapered portion 46 on the head former section 42 when the inner sleeve member 12 is fully seated in the outer sleeve member 11 as seen in FIG. 9. Because a greater force is required to start the formation of the blind head in those portions of the sleeve members 11 and 12 projecting out of the blind side of the workpieces, it may be desirable to start the formation of the blind head as the inner sleeve member 12 is driven into position. To do this, the difference between the lengths $L_1$ and $L_2$ of sleeve members 11 and 12 is selected to be sligthly less than the length of the head former section 42 on the stem 14 so that the projecting end 34 of side wall 30 on sleeve member 12 is forced up the tapered portion 46 of the head former section 42 during the final movement of the sleeve member 12 as it is driven. This causes the end of side wall 30 to be expanded which in turn expands the side wall 20 of the outer sleeve member 11 to start the formation of the blind head.

Figure 11:
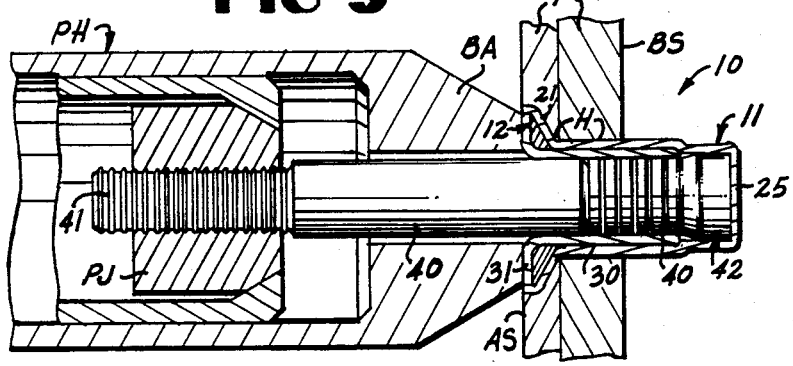
FIG. 11 is a view similar to FIG. 9 showing the stem ready to be pulled into position.
Figure 12:
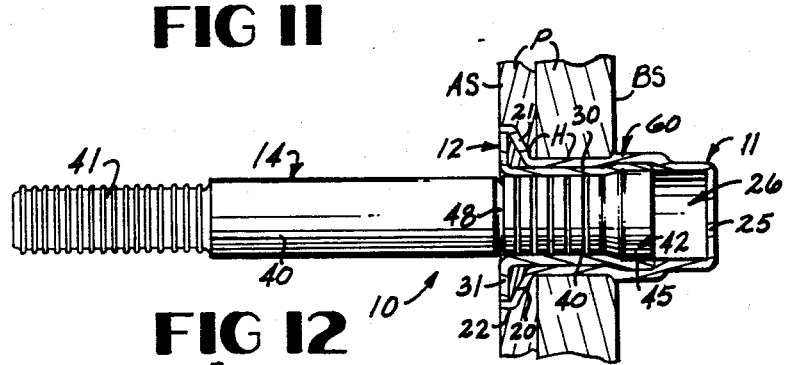
FIG. 12 is a view similar to FIG. 11 after the stem has been pulled to form the blind head.

After the inner sleeve member 12 is fully seated, the hammer H is removed and the pulling head PH of a pulling tool of known construction is inserted over the gripping portion 41 of stem 14 as seen in FIG. 11 until the backup anvil BA of head PH rests against the head flange 31 on the inner sleeve member 12 and the pulling jaws PJ grip the gripping portion 41 on stem 14. The pulling tool is then activated to pull the stem 14 into head PH and move the head former section 42 into the projecting end 34 of the inner sleeve side wall 30. This expands the inside of the inner sleeve member 12 on the blind side of the workpieces out to the diameter of the head portion 45 on section 42 and thus expands the side wall 20 on the outer sleeve member 11 in registration with the expanded portion of the inner sleeve side wall 30 by a like amount to form a blind head 60 of a diameter as seen in FIG. 12. The head former section 42 is pulled into sleeve member 12 until the tapered portion 46 is in registration with the blind side of the workpieces to provide clamp-up and insure that the blind head 60 cooperates with head flange 21 to hold the workpieces together.

Figure 13:
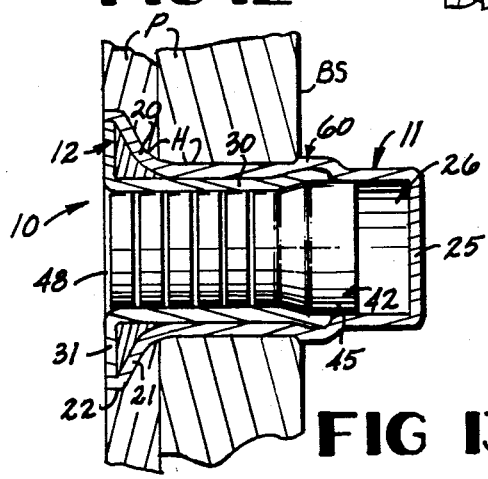
FIG. 13 is an enlarged cross-sectional view similar to FIG. 12 after the stem has been broken to complete the installation of the fastener assembly.

When formation of the blind head 60 is complete, the breakneck groove 48 should be aligned with the head flange 31 on the inner sleeve member 12. This may be provided by controlling the length of the stroke on the pulling jaws PJ in known manner together with the provision for grip adjustment in head former section 42. The stem 14 can then be broken with a lateral force to break the stem at the breakneck groove 48 to produce the final installed fastener assembly as seen in FIG. 13.

Grip adjustment of head former section 42 is typically provided by selecting a strength for section 42 so that it will wiredraw when the reactive force thereon exceeds a preselected level as more fully described in our earlier application Ser. No. 370,060. When the tapered portion 46 has moved inside the side wall 30 of sleeve member 12 to expand it, there will be a reactive force buildup when the portion 46 reaches the level of the blind side BS of the workpieces P. The wiredrawability of head former section 42 is selected so that this force buildup will wiredraw the section 42 down to the diameter of support section 40 so that stem 14 can continue to move toward the head flange 31 until the breakneck groove 48 lines up with the head flange 31 on the inner sleeve member 12. Wire-drawing to achieve grip variation is well known in the blind rivet art.

It will be appreciated that, as the inner sleeve member 12 is driven into position, the side wall 30 thereof is forced inwardly into the locking grooves 49 by the compressive forces exerted thereon by the workpieces P through the side wall 20 of the outer sleeve member 11 as described in our earlier application Ser. No. 370,060. The side wall 30, however, slides over the sharp corners of the locking grooves 49 and up the tapered bottom surface thereof as it moves to the right as seen in the figures. Likewise, when the stem 14 is pulled to the left as seen in FIG. 12, the side wall 30 of sleeve member 12 continues to slide over the sharp corners and up the tapered bottom surfaces of the locking grooves 49. When the stem 14 has been pulled sufficiently to form the blind head 60 and the pulling operation is stopped, the sharp corners at grooves 49 tend to dig into the side wall 30 if the stem 14 tries to move to the right to work out of the sleeve member 12. Thus, the locking grooves 49 and the head former section 42 mechanically lock the stem 14 in the sleeve members 11 and 12. The action of the sharp corners at grooves 49 on the side wall 30 do not affect the fatigue life of the joint because this action is isolated from the surfaces of the holes H through the workpieces.

The lip 22 on the head flange 21 serves to strengthen the head flange 21 against deformation in a direction parallel to the axis of sleeve member 11. This serves to insure that the head flange 21 will hold the side wall 20 axially fixed in holes H as the inner sleeve member 12 is driven into the outer sleeve member 11 and further serves to insure that the head flange 21 will not collapse after the fastener assembly is installed to maintain the clamp-up on the workpieces.

The blind head 60 formed in the side wall 20 of the outer sleeve member 11 is an expanded band in the side wall 20. Thus, the formation of the blind head 60 does not split or otherwise open up the side wall 20 on the blind side of the workpieces. Since the end wall 25 closes the end of the side wall 20, the passage 26 in the outer sleeve member 11 remains sealed on the blind side of the workpieces to effectively seal the fastener assembly 10 against leakage to or from the blind side of the workpieces P.

In order for the fastener assembly 10 to be installed, it will be appreciated that the column strength of the inner and outer sleeve members 11 and 12 must be sufficient to allow the inner sleeve member 12 to be driven without deterioration of either sleeve member. On the other hand, the difference between the inside diameter of the outer sleeve member 11 and the inside diameter of the inner sleeve member 12 limits the amount the blind head can be expanded in order for the head former section 42 on stem 14 to slide into the sleeve member 12. Further, the side walls of both sleeve members 11 and 12 must be sufficiently thin to prevent significant thinout of the side walls both during installation and during use. Good results have been obtained where the outer sleeve member 11 has a side wall thickness of about 0.016 inch and the inner sleeve member 12 has a side wall thickness of about 0.020 inch when the sleeve members are made out of A286 stainless steel. The diametrical expansion of the blind head for these dimensions is equal to 0.040 inch less the amount of expansion of the side wall of the outer sleeve member 11 in the holes (i.e. for a hole expansion of about 0.006 inch, the blind head expansion is about 0.034 inch). Larger blind head expansions can be achieved by omitting end wall 25 on the outer sleeve member 11 to allow the head former section 42 to project therefrom or using a number of other techniques such as those described in our earlier application Ser. No. 370,060.

When weaker materials such as aluminum alloys are used for the inner sleeve member 12, there may be some difficulty in preventing the side wall 30 of the sleeve adjacent the head flange 31 from collapsing as it is being driven into the outer sleeve member 11. To prevent this occurring, the washer 15 may be made sufficiently strong to reinforce the inner sleeve member 12 as it is being driven. The dimensions and strength of material of washer 15 is selected to provide a hoop strength in the washer 15 sufficient to prevent the side wall 30 in the inner sleeve member 12 from deforming outwardly as the inner sleeve member 12 is driven.

Figure 14:
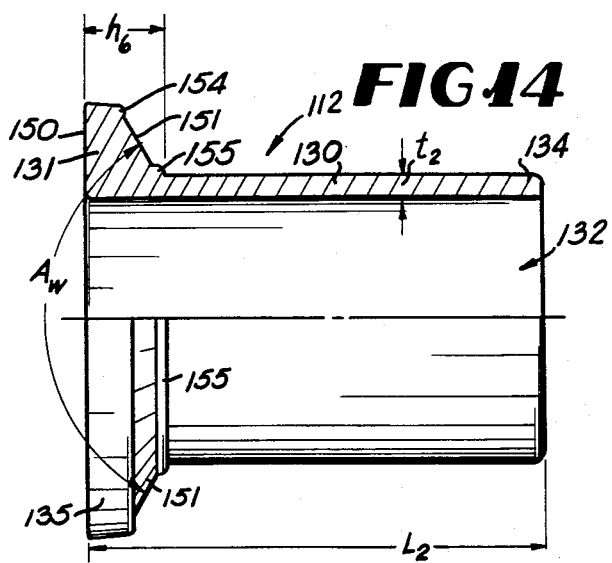
FIG. 14 is an enlarged side elevational view shown partly in cross-section of another form of the inner sleeve member.
Figure 15:
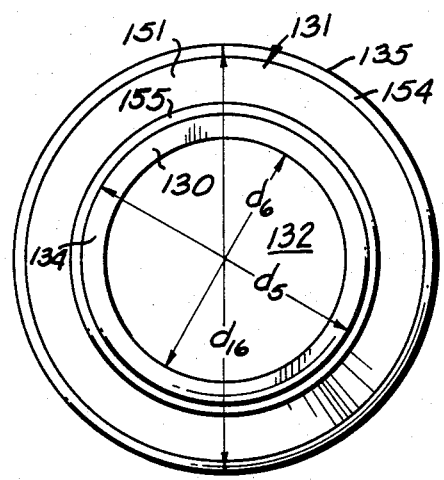
FIG. 15 is an end view of the sleeve member seen in FIG. 14.
Figure 16:
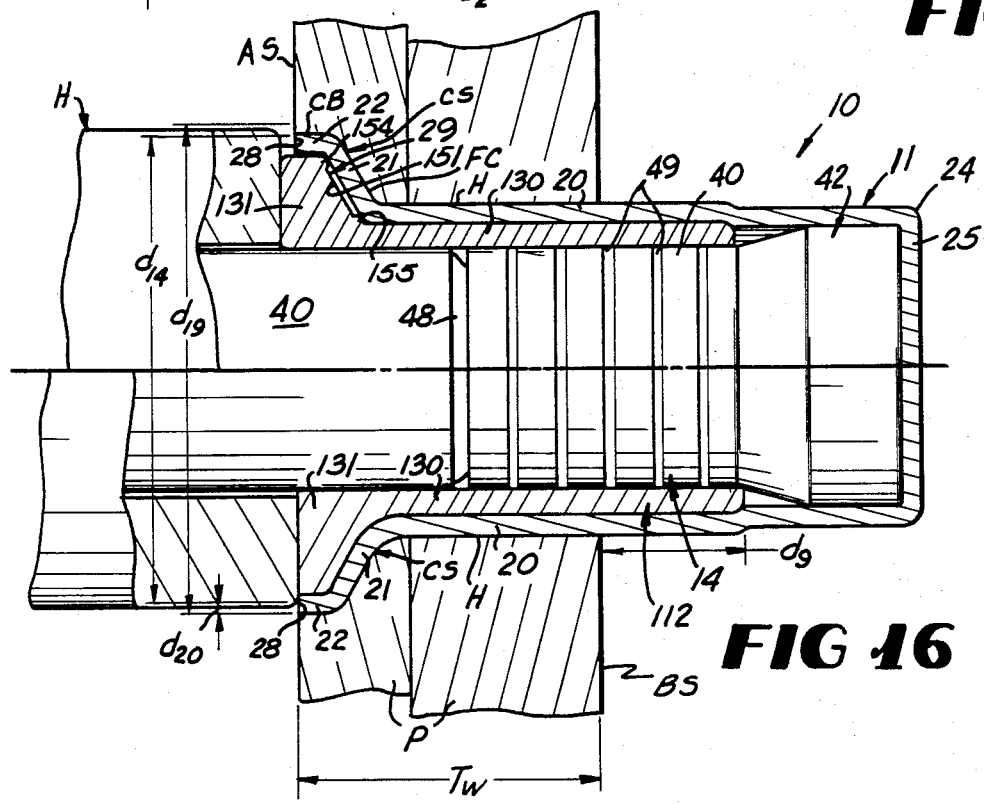
FIG. 16 is a split longitudinal cross-sectional view showing the inner sleeve member of FIG. 14 being driven into position.

It will be appreciated that the washer and inner sleeve member may be made as an integral part as illustrated in FIGS. 14–16 and designated generally by the numeral 112. The inner sleeve member 112 includes a seamless cylindrical side wall 130 provided with an annular deformable head flange 131 integral with one end thereof. The head flange 131 corresponds generally to the head flange 31 on the inner sleeve member 12 in combination with the washer 15. Thus, the head flange 131 has a trailing end surface 150 normal to the central axis of the sleeve member 112 and an outside conical surface 151 which tapers inwardly from the trailing to the leading end of the head flange 131. The sleeve member 112 defines a common passage 132 extending through both the side wall 130 and the head flange 131. The outside corner of the projecting end 134 of the side wall 130 is rounded to permit the sleeve member 112 to be driven into the outer sleeve member 11 similarly to the first embodiment of the invention. The outside peripheral edge 135 on the head flange 131 may be forwardly tapered as illustrated in FIG. 14 to assist in seating the head flange 131 in lip 22 on the outer sleeve member 11 as will become more apparent. The head flange 131 has an outside diameter $d_{16}$ corresponding to that of the washer 15 in the first embodiment of the invention.

A bead section 154 is provided at the juncture of the tapered surface 151 and the outside peripheral edge surface 135 to be deformed as the inner sleeve member is driven into the outer sleeve member as will become apparent. Likewise, a leading bead section 155 is provided at the juncture between the tapered surface 151 and the outside surface of the side wall 130 which is also adapted to be deformed to expand the outer sleeve member 11 at the juncture between the head flange 21 and the side wall 20 thereof as will become more apparent.

The conical surface 151 tapers at an included angle $A_W$ corresponding to the angle $A_H$ of the head flange 21 on the outer sleeve member 11. While the overall shape of the head flange 131 is not critical as long as a sufficient volume is present in the head flange 131 to enlarge the head flange 21 and lip 22 on the outer sleeve member 11 corresponding to the first embodiment of the invention, it is preferable that the trailing end surface 150 on the head flange 131 be oriented normal to the axis of the sleeve 112 to provide a large driving area for engagement by the hammer H when the inner sleeve member 112 is driven into position as will become more apparent. The head flange 131 has an overall height $h_6$ which is greater than the height $h_2$ of the head flange 21 and lip 22 on the outer sleeve member 11 as will become more apparent.

The side wall 130 of the inner sleeve member 112 has a thickness $t_2$, an outside diameter $d_5$, and an inside diameter $d_6$ corresponding to the inner sleeve member 12. Likewise, the inner sleeve member 112 has an overall length $L_2$ which is about equal to the thickness $T_W$ of the workpieces plus the depth $d_9$ of the blind head to be formed in the fastener assembly as will become more apparent.

FIG. 16 is a split figure with the upper half showing the inner sleeve member 112 driven into the outer sleeve member 11 until the beads 154 and 155 have just contacted the head flange 121 on the outer sleeve member 11 and with the lower half showing the inner sleeve member 112 after it is fully seated in the outer sleeve member 11. It will be noted that the inner sleeve member 112 is driven into the outer sleeve member 11 in a manner similar to the driving of the first embodiment of the inner sleeve member 12 and the washer 15. Thus, when the inner sleeve member is driven from the position seen in the upper half of the FIG. 16 to the position seen in the lower half of FIG. 16 by the hammer H, the beads 154 and 155 as well as the main body of the head flange 131 will be deformed so that, as the end surface 150 is driven to a position flush with the trailing end surface 28 on the lip 22 of the outer sleeve member 11, the head flange 131 will be deformed so that it is forced to flow both toward the bottom of the counterrecess 29 in outer sleeve member 11 to expand that area of the outer sleeve member 11 where the head flange 21 and side wall 20 join to place this area in interference with the juncture of the countersink CS and holes H in the workpieces and to radially expand the lip 22 on the outer sleeve member 11 into interference with the counterbore CB in the workpieces P. This causes the lip 22 on the outer sleeve member 11 to be expanded from diameter $d_{14}$ out to diameter $d_{19}$ or an interference difference $d_{20}$. Thus, it will be seen that the height $h_6$ of the head flange 131 controls the difference $d_{20}$.

The completion of the installation of the fastener assembly 10 incorporating the inner sleeve member 112 is the same as that described for the first embodiment of the invention.

It will likewise be appreciated that the washer may be made integral with the head flange and lip on the outer sleeve member. In that instance, the washer portion would be radially expanded as the side wall on the inner sleeve member is driven therethrough and then deformed as the inner sleeve head flange is driven thereagainst.

When the fastener assembly of the invention is to be installed in workpieces made of a composite material, that is, workpieces having high strength, high modulus fibers embedded in a plastic matrix, it may be desirable to cushion the fastener assembly to prevent contact between the hole surface through the workpieces and the substantially incompressible material of the outer sleeve member 11. When such cushions are applied, however, they must, at the same time, permit loading contact between the fastener assembly and the hole surface.

Figure 17:
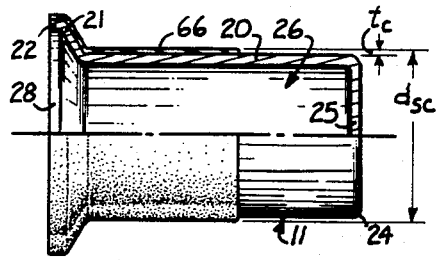
FIG. 17 is a side view shown partly in section of cushioned embodiment of the invention.

To provide this cushion, the outside surface of the outer tubular member 11 may be covered with a tubular cushion 65 as seen in FIGS. 17-21 forming a cushion layer 66 along the outside of the side wall 20, head flange 21, and lip 22. The cushion layer 66 is made of a material which is compressible and should have a strength in its compressed state sufficient to transmit the joint load from the workpieces to the outer sleeve member 11 as will become more apparent. The cushion layer 66 has an initial nominal thickness $t_C$ along its length to produce an initial outside diameter $d_{SC}$ on cushion 65 as seen in FIG. 17. The initial thickness $t_C$ is selected so that, when the cushion layer 66 has been compressed to a thickness sufficient to transmit the operating load from the workpieces to the sleeve member 11, the cushion layer does not significantly flow axially along the sleeve member 11. This thickness, of course, depends on the particular material selected for the cushion 65. While a variety of materials may be used for cushion 65, plastic materials such as vinyl or polyurethane varnish or epoxy compounds have been found satisfactory. These materials have been found to be able to transmit the operating load from the workpieces to the sleeve member 11 when the cushion layer 66 has been compressed from an uncompressed thickness $t_C$ of about 0.004 inch to a compressed thickness $t_{CP}$ of about 0.001 inch or less and do not significantly flow axially of the sleeve member 11 under the operating load of the joint as compressed thickness.

Figure 18:
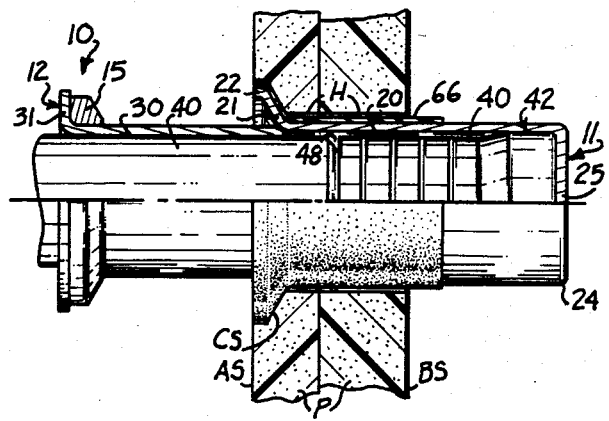
FIG. 18 is a view similar to FIG. 17 showing the cushioned embodiment ready to be installed.
Figure 20:
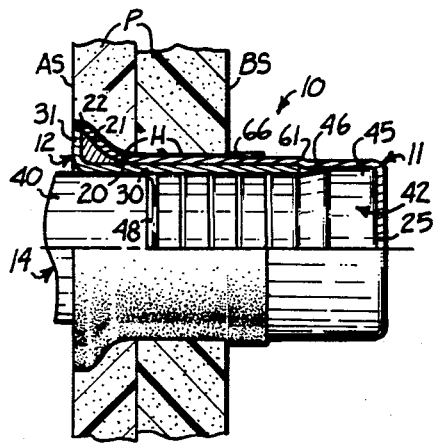
FIG. 20 is a view similar to FIG. 18 after the inner sleeve member has been driven; and, FIG. 21 is a greatly enlarged portion of FIG. 20 showing the deformation of the cushion.
Figure 19:
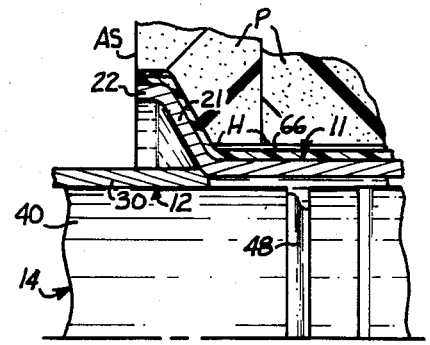
FIG. 19 is a greatly enlarged portion of FIG. 18.
Figure 21:
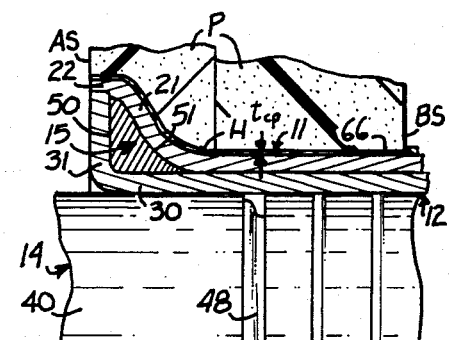

The fastener assembly using the cushion 65 is inserted into the holes in the workpieces in clearance therewith as seen in FIGS. 18 and 19 to prevent damage to the cushion 66. After the inner sleeve member 12 has been driven into the outer sleeve member 11, the cushion 65 will be compressed as seen in FIGS. 20 and 21 down to a compressed thickness $t_{CP}$ so that the cushion layer 66 will transmit the operating load therethrough to the fastener assembly without the cushion layer 66 significantly flowing axially of the outer sleeve member 11.

What is claimed as invention is:

1. A fastener assembly adapted to attach workpieces together through aligned holes therein of an initial hole diameter having a countersink at one end of the holes comprising:
    an outer sleeve member including an elongate tubular side wall and an annular head flange integral with one end of said side wall, said head flange having a size and shape adapted to fit in the countersink in the workpieces;
    an inner sleeve member including an elongate tubular side wall and an annular head flange integral with one end of said side wall, said inner sleeve side wall having an outside diameter larger than the inside diameter of said outer sleeve side wall such that, when said inner sleeve member is driven into said outer sleeve member, said inner sleeve side wall will expand said outer sleeve side wall, and said inner sleeve head flange defining a trailing end surface thereon oriented normal to the central axis of said inner sleeve member;
    a stem including a support selection thereon slidably extending through said inner sleeve member and having an outside diameter substantially equal to the inside diameter of said inner sleeve side wall to internally support said inner sleeve member while being driven into said outer sleeve member; and
    deformable means operatively associated with said inner sleeve head flange and said outer sleeve head flange and adapted to be totally captivated between said inner sleeve head flange and said outer sleeve head flange, said deformable means deformed as an incident to the driving of said inner sleeve member into said outer sleeve member to expand said outer sleeve head flange.

2. The fastener assembly of claim 1:
    wherein the countersink in the work pieces includes a cylindrical counterbore section with a counterbore diameter larger than the hole diameter opening onto the surface of the workpieces and a frustoconical section which tapers inwardly from the counterbore section to the holes; and
    wherein said outer sleeve head flange includes a cylindrical annular lip integral with the outer peripheral edge thereof and projecting out from said outer sleeve head flange in a direction opposite to said outer sleeve side wall, said annular lip having an outside diameter corresponding to the counterbore diameter so that said lip and said outer sleeve head flange will respectively fit in the counterbore and the frusto-conical of the countersink so that, when said deformable means is deformed, said outer sleeve annular lip will be expanded into interference with the counterbore section of the countersink.

3. The fastener assembly of claim 2 wherein said deformable means is integral with said inner sleeve head flange.

4. The fastener assembly of claim 2 wherein said deformable means includes a deformable washer adapted to be slidably received over said inner sleeve side wall and engaged by said inner sleeve head flange and to fit in said outer sleeve head flange and said outer sleeve lip prior to deformation of said washer.

5. The fastener assembly of claim 2, wherein said deformable means includes a ring adapted to be slidably received over said inner sleeve side wall and positionable immediately under said inner sleeve head flange to restrain said inner sleeve side wall against collapse as said inner sleeve member is driven into said outer sleeve member.

6. The fastener assembly of claim 1 further including a compressible cushion covering at least the outside surface of said outer sleeve side wall, said cushion adapted to be compressed between said outer sleeve side wall and the hole surface as an incidence to the installation of said fastener assembly in the holes to a compressed thickness of the material of said cushion below which insignificant material flow within said cushion takes place under load, and so that said cushion is maintained under sufficient compression between said outer sleeve member and to the workpieces to cause the operating load thereon to be transferred from the workpieces to said fastener assembly through said cushion.

7. The fastener assembly of claim 1:
wherein said outer sleeve side wall has an initial outside diameter such that said outer sleeve side wall is receivable through the holes in the workpieces; and
wherein the difference between the outside diameter of said inner sleeve side wall and the inside diameter of said outer sleeve side wall is such that said outer sleeve side wall will be expanded into a prescribed interference fit by expanding the holes through the workpieces as said inner sleeve member is driven into said outer sleeve member.

8. The fastener assembly of claim 1:
wherein said outer sleeve side wall has a length such that that end of said outer sleeve side wall opposite said outer sleeve head flange projects from the workpieces for the formation of a blind head therein; and
wherein said inner sleeve side wall has a length such that that end of said inner sleeve side wall opposite said inner sleeve head flange projects from the workpieces when said inner sleeve member is driven into said outer sleeve member for the formation of a blind head therein.

9. The fastener assembly of claim 8 wherein said stem further includes a blind head former section integral with one end of said support section and having an outside diameter larger than the inside diameter of said inner sleeve side wall, said head former section adapted to expand those portions of said inner and outer sleeve side walls projecting out of the workpieces opposite said head flanges to form a blind head therein.

10. The fastener assembly of claim 9 wherein said stem further includes a gripping section opposite said blind head former section adapted to be gripped after said inner sleeve member is driven into said outer sleeve member to pull said head former section into said inner sleeve member to form the blind head.

11. The blind rivet assembly of claim 9 wherein said outer sleeve member further includes retaining means for fixedly locating said head former section on said stem with respect to said outer sleeve member so that said inner sleeve side wall is expanded over said head former section as said inner sleeve member is driven into said outer sleeve member to form the blind head.

12. The blind rivet assembly of claim 8 wherein said outer sleeve member further includes an end wall integral with and closing that end of said outer sleeve side wall opposite said head flange to seal the blind end of said rivet assembly.

13. The fastener assembly of claim 9 wherein said support section on said stem further defines a plurality of locking grooves therearound into which said inner sleeve side wall is forced under the compressive forces exerted thereon by the workpieces when said outer sleeve side wall is expanded into interference fit, said locking groove having a configuration such that sliding movement between said inner sleeve side wall and said stem in a first direction such that said head former section on said stem is moved toward said inner sleeve member is permitted but sliding movement between said inner sleeve side wall and said stem in the opposite direction is prevented.

14. The fastener assembly of claim 2 wherein said inner sleeve head flange has an outside diameter such that, when said inner sleeve member is driven into said outer sleeve member and said deformable means has expanded said annular lip on said outer sleeve member, said inner sleeve head flange will just fit within said annular lip when said inner sleeve member is fully driven into said outer sleeve member.

15. The fastener assembly of claim 9 wherein said blind head former section includes grip adjustment means.

* * * * *